United States Patent [19]

Takeo et al.

[11] Patent Number: 4,515,521

[45] Date of Patent: May 7, 1985

[54] WELDING TORCH APPARATUS

[75] Inventors: Tadashi Takeo, Sakado; Toru Yamamoto; Sachihiro Yamashito, both of Hidaka, all of Japan

[73] Assignee: Honda Giken Kogyo Kabushiki Kaisha, Tokyo, Japan

[21] Appl. No.: 346,935

[22] Filed: Feb. 8, 1982

[30] Foreign Application Priority Data

Feb. 6, 1981 [JP] Japan .................................. 56-14923
Feb. 6, 1981 [JP] Japan .................................. 56-15824

[51] Int. Cl.³ .............................................. B23K 9/12
[52] U.S. Cl. ...................................... 414/735; 901/42; 219/124.1
[58] Field of Search ....................... 414/1, 4, 730, 732, 414/735, 917, 729; 219/136, 124.1, 125.1, 125.11, 60 A; 266/62, 63, 75, 77; 128/4, 303 R, 303 B; 901/42

[56] References Cited

U.S. PATENT DOCUMENTS

| 3,739,923 | 6/1973 | Totsuka | 414/730 X |
| 3,784,031 | 1/1974 | Niitu et al. | |
| 3,936,657 | 2/1976 | Groth | 219/136 |
| 4,068,763 | 1/1978 | Fletcher et al. | 414/4 |
| 4,364,707 | 12/1982 | Ott | 414/744 B |
| 4,365,928 | 12/1982 | Baily | 414/4 X |
| 4,380,696 | 4/1983 | Masaki | 414/1 X |

FOREIGN PATENT DOCUMENTS 1464952 2/1977 United Kingdom .

Primary Examiner—Joseph E. Valenza
Assistant Examiner—Terrance L. Siemens
Attorney, Agent, or Firm—Armstrong, Nikaido, Marmelstein & Kubovcik

[57] ABSTRACT

A welding torch is disclosed in combination with an industrial robot, the industrial robot having an arm and a wrist at one end thereof, the wrist including a rotary casing having a rotary shaft extending in a direction along the axis of the arm and a pair of sprocket members disposed on the sides of the rotary shaft. The torch and robot further have a first central core wire guide within the rotary shaft and extending along the axis thereof, and a second central core wire guide within the welding torch and fixed to the rotary shaft, the second central core wire guide being aligned with and in communication with the first central core wire guide.

4 Claims, 3 Drawing Figures

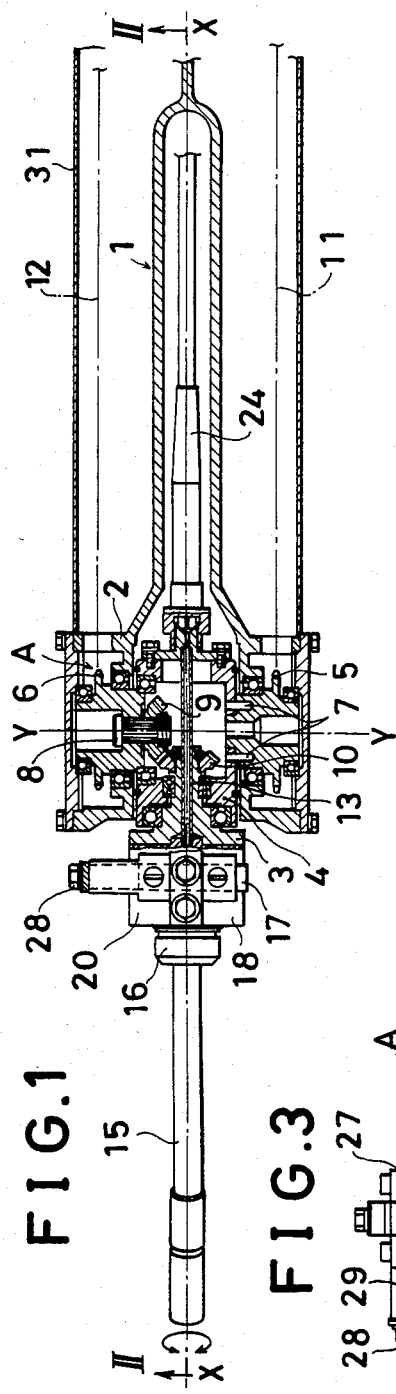
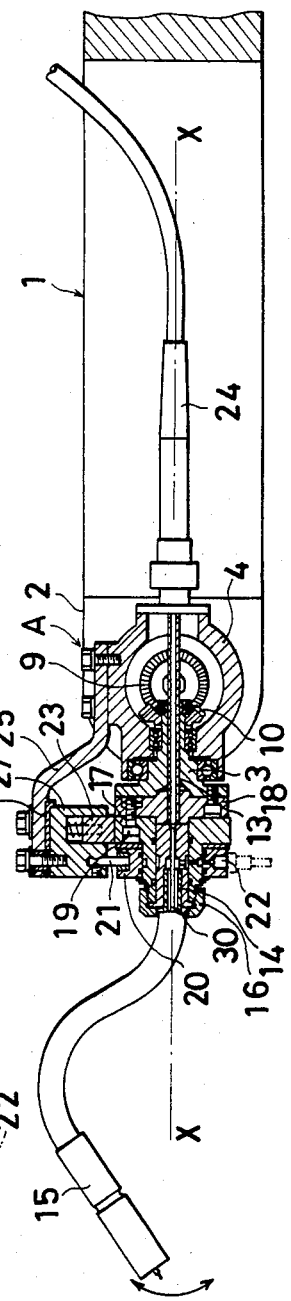
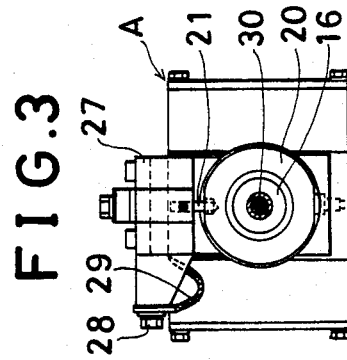
FIG.1
FIG.2
FIG.3

WELDING TORCH APPARATUS

BACKGROUND OF THE INVENTION

1. Field of the Invention

This invention relates to a welding torch apparatus applied chiefly to a wrist portion of an industrial robot.

2. Description of the Prior Art

Industrial robots are known which have an arm member extending forwards from a main body of the robot, with the robot having a wrist mechanism on the front end thereof. The wrist mechanism comprises a rotary casing having a rotary shaft extending forwards therefrom and a pair of sprocket members disposed on both of the outer sides thereof. It has also been known in the foregoing type of robot to separately attach a welding torch means thereto. In this type of robot, the welding torch means is generally artlessly attached to the front surface of the rotary shaft through an attaching plate. This type of arrangement, however, is inconvenient in that the attaching section thereof is large and during the operation thereof, a core wire to the torch means is subject to twisting and bending.

SUMMARY OF THE INVENTION

It is an object of the present invention to provide a welding torch in combination with an industrial robot in which the coupling between the welding torch and industrial robot is relatively small.

It is another object of the present invention to provide a coupling between a welding torch and an industrial robot wherein the wrist of the robot may be manuvered without severely twisting or bending the core wire extending from the arm of the robot into the welding torch.

It is a further object of the present invention to provide means for supplying electric power to a welding torch coupled to the wrist of an industrial robot.

The present invention is directed to an industrial robot having an arm member extending forwards from a stationary member such as a main body of the robot with a wrist mechanism extending from the front end portion of the arm. The wrist mechanism comprises a rotary casing having a rotary shaft extending forwards therefrom along the axis of the arm member and a pair of sprocket members disposed on both the sides thereof. It is characterized in that the rotary shaft has a central core wire guide extending forwards and rearwards along the axis thereof, and a welding torch means, having a central core wire guide member, in communication with the guide of the rotary shaft, is fixed to the front surface of the rotary shaft so as to extend forwardly therefrom.

BRIEF DESCRIPTION OF THE DRAWINGS

FIG. 1 is a top plan view, partly in section, of a preferred embodiment of the present invention;

FIG. 2 is a sectional view taken along the line II—II in FIG. 1; and

FIG. 3 is a sectional front view thereof.

DETAILED DESCRIPTION OF THE PREFERRED EMBODIMENT

Referring to the drawings, an arm member extends forwards from a stationary member such as a main body of a robot or the like, and a machine casing 2 is fixedly provided on the front end portion of the arm member 1. The machine casing 2 is provided therein with a wrist mechanism A comprising a rotary casing 4 having a rotary shaft 3 extending forwards therefrom along the axis X—X of the arm member 1, and a pair of sprocket members 5, 6 disposed on both the outsides thereof. The rotary casing 4 and the pair of sprocket members 5, 6 are mounted to be turnable about the axis Y—Y extending at right angles to the axis X—X, and one of the two sprocket members 5, 6, that is, the sprocket 5 on one side, for instance, is connected to the rotary casing 4 through a pin 7, while the other, that is, the sprocket member 6 on the other side is provided with a bevel gear 9 which is mounted on a shaft 8 protruding laterally inwards therefrom. The bevel gear 9 is meshed with a bevel gear 10 mounted on the rear end portion of the rotary shaft 3. Thus, if the sprocket member 5 on one side is turned, the rotary shaft 3 is moved through the casing 4 to turn upwards and downwards about the axis Y—Y along with the casing 4, and if the sprocket member 6 on the other side is turned, the rotary shaft 3 is moved through the bevel gears 9, 10 to turn about the axis X—X. Chains 11 and 12 are provided for driving the respective sprocket members 5, 6.

According to this invention, the rotary shaft 3 is provided therein with a central core wire guide 13 of an insulating material which extends forwards and rearwards along the axis X—X. A welding torch means 15, having at its rear end portion a central core wire guide member 14 which communicates with the guide 13, is fixed to the front end surface of the rotary shaft 3 so as to project forwards therefrom. The welding torch means 15 is provided on its rear end portion with the guide member 14 and an annular feeding member 17 is mounted thereon and fastened thereto through a box nut 16. The guide member 14 and feeding member 17 are fixed to the rear end portion on the front surface of the rotary shaft 3 through an insulation material 18 by means of a screw 19 or the like. A collar 20 is rotatable mounted on the feeding member 17, a pin 21 is provided on one side surface thereof for preventing the collar 20 from turning, and a gas supply opening 22 is in the other opposite side surface thereof. The feeding member 17 is adapted to be connected to an electric power source through a feeding brush 23 which is in contact with the peripheral surface thereof. The core wire guide 13 extends rearwards and is connected to a flexible conduit cable 24. Further, the rotary casing 4 is provided with a bracket 25 extending forwards, and a guide block 27 fixed thereon through an insulation layer 26, the brush 23 being held thereby. Furthermore, the guide block 27 extends laterally to form a feeding terminal portion 28, and the brush 23 is connected thereto through a flexible feeding member 29. A welding core wire 30 and a chain casing 31 are also provided.

The operation of the foregoing apparatus will be explained as follows:

If the sprocket member 5 is turned, the rotary shaft 3 is moved upwards and downwards about the axis Y—Y along with the torch member 15 extending forwards therefrom. If the sprocket member 6 is turned, the rotary shaft 3 is turned about the axis X—X along with the torch member 15. Thus, the torch member 15 can be given any desired movement. During the operation thereof, the core wire 30 is supplied forwards through the core wire guide 13 and the core wire guide member 14 extending along the axis X—X, so that the core wire is free from any severe twisting or bending thereof.

Further, during the operation, the electric power supply thereto can be always effected in a good condition through the feeding brush 23 and the feeding member 17. When the rotary shaft 3 is moved upwards and downwards about the axis Y—Y, both the feeding brush 23 and the feeding member 17 are moved therewith, so that good contact can be maintained between the two. When the rotary shaft 3 is turned about the axis X—X, the feeding member 17 is kept in slide contact at its outer periphery with the brush 23, so that a good contact is maintained between the two.

Furthermore, during this operation, the foregoing feeding terminal portion 28 moves only slightly along with the rotary casing 4, so that a feeding cable or the like which connects the same with the external power supply source is not subjected to any large twisting or bending.

Thus, according to this invention, the welding torch means is attached such that the rear end portion thereof is fixed to the front surface of the rotary shaft of the wrist mechanism and consequently, the attaching section thereof is small. Additionally, since the core wire is guided along the center axis of the rotary shaft, any twisting or bending thereof can be eliminated.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. In a welding torch in combination with an industrial robot, the industrial robot having an arm and a wrist means at one end thereof, the wrist means including a rotary casing means having a rotary shaft extending in a direction along the axis of said arm and a pair of sprocket members disposed on the sides of said rotary shaft said rotary casing means having a conduit cable attached to a rear surface thereof, said conduit cable disposed coaxially with said rotary shaft; the improvement comprising a first central core wire guide means within said rotary shaft and extending along the axis thereof said first central core guide means being coaxial with said conduit cable and extending to cover the portion of the conduit cable attached to said rotary casing means, and a second central core wire guide means within said welding torch and fixed to said rotary shaft, said second central core wire guide means being axially aligned and colinear with and in communication with said first central core wire guide means such that no corners are present in the path of a welding core wire and such a welding core wire disposed within said first and second wire guide means may travel along the lengths thereof without being severely twisted between said first and second central core wire guide means, despite the motion of the welding torch.

2. A welding torch in combination with an industrial robot as set forth in claim 1, wherein said rotary casing includes a feeding brush means for connection to a source of electric power and said welding torch includes a feeding means, said feeding brush means remaining in contact with said feeding means during the rotational movement of the rotary shaft as well as during the movement of the rotary casing means for supplying electric power to said welding torch therethrough and said welding torch further includes a guide block, and a bracket for fixing said guide block to said rotary casing, said feeding brush means being coupled to said guide block and a non-rotatable collar means mounted on said guide block and coaxial with said feeding member for providing a pathway to supply gas to said welding torch.

3. A welding torch in combination with an industrial robot as set forth in claim 2, including a feed terminal having a mount for an electrical feed cable which provides an electrical connection to said feeding brush means, said feed terminal mounted on said rotary casing means, such that it moves only with said rotary casing means to keep said feed cable from twisting during the operation of the welding torch.

4. In a welding torch in combination with an industrial robot, the industrial robot having an arm and a wrist means at one end thereof, the wrist means including a rotary casing means having a rotary shaft extending in a direction along the axis of said arm and a pair of sprocket members disposed on the sides of said rotary shaft; the improvement comprising the further combination of:

a first and second guide means disposed axially within the rotary shaft and the welding torch, respectively, for preventing a core wire inserted therein from being severely twisted between said first and second guide means during operation; and a circular feed member disposed around said rotary shaft and adapted for engagement with a brush mounted on said rotary casing means, such that said brush engages and slides along the periphery of said feed member during all rotational movements of the torch, including the rotational movement of said rotary shaft as well as being constantly engaged during the pivotal movement of said rotary casing means.

* * * * *

UNITED STATES PATENT AND TRADEMARK OFFICE
CERTIFICATE OF CORRECTION

PATENT NO. : 4,515,521

DATED : May 7, 1985

INVENTOR(S) : TADASHI TAKEO ET AL

It is certified that error appears in the above-identified patent and that said Letters Patent is hereby corrected as shown below:

On the cover page, Item [75], change "Sachihiro Yamashito" to --- Sachihiro Yamashita ---.

Signed and Sealed this

Eighth Day of October 1985

[SEAL]

Attest:

DONALD J. QUIGG

Attesting Officer

Commissioner of Patents and Trademarks—Designate